United States Patent Office 2,851,014
Patented Sept. 9, 1958

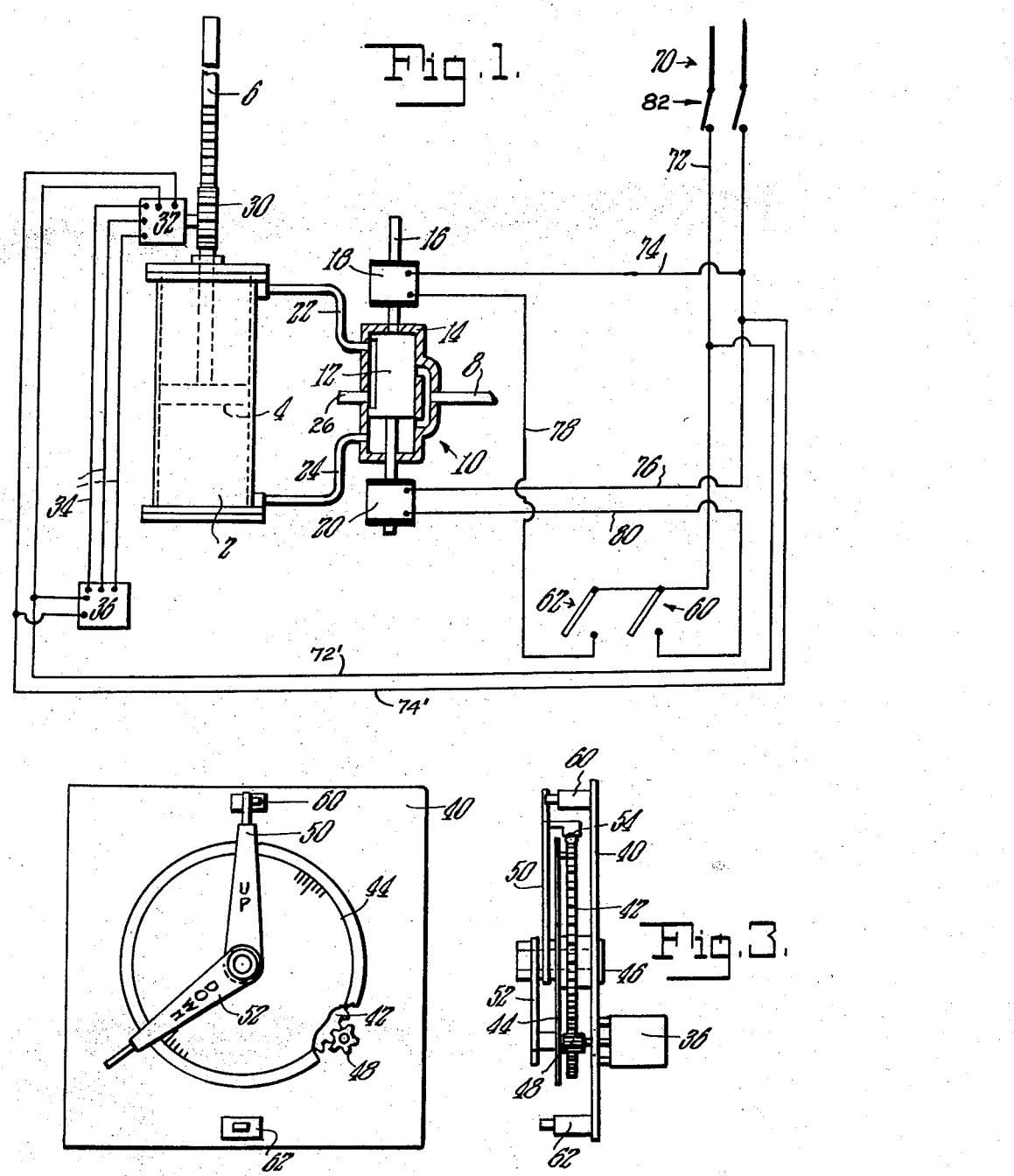

2,851,014

PISTON ROD CONTROL MECHANISM

Elliott L. Healy, East Hanover, N. J., assignor, by mesne assignments, to Ionic Electrostatic Corporation, Garfield, N. J., a corporation of New Jersey Application December 17, 1956, Serial No. 628,672

3 Claims. (Cl. 121—148)

This invention relates to mechanism for controlling the operation of a piston rod actuated by a piston reciprocable in a cylinder.

The principal object of the invention is the provision of mechanism for controlling the stroke of a piston rod, that is for varying the stroke of said rod.

In many cases, it is desired to utilize a fractional portion only of the stroke of a piston rod and/or to employ a fractional portion of the stroke somewhere in the range of the stroke.

The novel features of the invention are adapted for broad application, and while particularly adapted for use in connection with apparatus for depositing paint or coating material, the novel mechanism is not limited thereto.

As an example of the usefulness of the invention, it will be assumed that the full or maximum stroke or travel of a piston and rod is a certain number of inches and it is desired to utilize some fraction only of said maximum. According to the invention, it is possible to employ said fractional travel at either end of the maximum stroke or at any point along the maximum travel.

The mechanism of the invention is such that the length of stroke of the piston rod may, during reciprocation thereof, be reduced from the maximum to a portion only thereof and said portion may be located as desired within the maximum. That is, any predetermined portion of the stroke of a piston rod may be selected and located at any predetermined location along the maximum or full stroke of the rod.

According to an important feature of the invention, mechanism for manual control of a piston and rod may be located at a position remote from the piston and rod being controlled, thereby to achieve efficiency in operation, same being accomplished without the employment of mechanical connections, such as linkage or the like.

The mechanism is readily and easily operable and is so arranged that the stroke of the piston and its rod are quickly and accurately responsive thereto.

Various changes and modifications may be made in the form of the mechanism, to adapt it for various uses, without departing from the spirit and scope of the invention which will be disclosed in the form at present preferred in connection with the accompanying drawings wherein:

Fig. 1 is a diagrammatic view of apparatus embodying the novel features of the invention; and Figs. 2 and 3 are plan and side elevational views respectively of control mechanism embodying the novel features of the invention.

Referring now to the drawings in detail, the invention will be fully described.

A cylinder is represented by 2 which has a piston 4 reciprocable therein and carrying a piston rod 6.

Pressure is supplied the cylinder by a connection 8 from a pressure supply such as a pump, tank or the like. Pressure may be of air, liquid, or the like. Pressure is directed to opposite ends of the cylinder, through a valve 10, to move the piston and its rod in opposite directions.

The valve 10 may take any form desired. For purposes of disclosure, a plug 12 is slidable, in a casing 14, and has a spindle or stem 16 operably related, in the usual manner, to solenoids 18 and 20.

Connections 22 and 24 connect upper and lower ends respectively of the cylinder 2 to the valve 10. In the position of the plug 12, as shown, pressure through connection 8, has been delivered to the lower side of the piston. The casing 14 is provided with an outlet 26 so that exhaust flows from the cylinder outwardly through the plug 12 and outlet 26. The outlet may be connected to an exhaust system for return to the source of pressure.

The member 12 of the valve is moved up or down accordingly as one or the other of the solenoids is energized.

It may be desired to employ the full or maximum stroke of the piston and its rod, or a shorter portion only of the stroke, depending on the apparatus being operated by the piston rod. It may in some cases be desired to make use of a short portion of the stroke at the top or the bottom of the full stroke, or at some intermediate portion of said stroke, that is to locate a short portion of the stroke in various locations along the full stroke, and same is accomplished by the means to be described.

The rod 6 is provided with teeth, as shown, in mesh with which is a gear 30 of a selsyn motor 32 of well known form. Said selsyn 32 may be called a transmitter and is electrically connected by connections 34 in the usual manner to a receiving selsyn motor 36.

As the rod 6 reciprocates, the shaft of selsyn 36 rotates accordingly in one direction or the other. The shaft of the selsyn 36 is rotated by reason of the connections 34.

The selsyns 32 and 36 are connected by the connections 72' and 74' to the lines 72 and 76.

The selsyn 36 is secured to a support 40, as shown in Fig. 3. A gear or toothed member 42 integral with a disc or dial 44 are freely rotatable on a stud 46, of said support. A gear 48 of the selsyn 36 is in mesh with gear 42, so that said gear and dial are rotated accordingly as the selsyn 32 is operated by reciprocation of the rod 6.

The piston stroke may be of considerable length, say fifty inches or so, which results in many revolutions of the selsyn. It is desired for a full stroke of the piston that the gear 42 and dial 44 rotate say 180 degrees. This may be accomplished by selecting the proper gear ratios.

Arms 50 and 52 are freely and independently rotatable on the stud 46, and independently of the gear 42 and dial. Said arms are releasably locked to the gear by spring pressed detents 54 in outer ends thereof which engage the teeth of said gear 42 so that the arms are rotated by said gear.

Detents 54 may consist of springs which tend to bear against the teeth of gear 42 and function to rotatively lock the arms to the gear. When it is desired to adjust the relative position of one arm, its spring detent is forced clear of the teeth of gear 42 thus permitting the arm to move relative to the gear.

Switches 60 and 62, which may be called up and down switches, are carried by the support 40, and are actuated by the outer ends of the arms 50 and 52.

For illustrative purposes, said switches will be of the normally open type, where a lever is biased to open position of the switch. When a switch lever is acted upon by an arm, the switch closes a circuit. A spring returns the lever to open position of the switch when the lever is released. Any other form of switch may be employed.

An electrical power source is represented by 70, one side of which is connected to the switches 60 and 62 by 72. The other side of the power source is connected to one terminal of the valve solenoids 18 and 20 by 74 and 76 respectively. Opposite terminals of said valve solenoids are connected to the switch contacts 62 and 60 by 78 and 80 respectively.

Energy from the power source may be controlled by switch means in said source or by a switch included in connections 72 and 76, indicated by 82.

It will be assumed that arm 50 has been set to close switch 60. Energy from the power source, as by closing a switch therein, or by closing switch 82, energizes solenoid 20 to shift plug 12, to move the piston in one direction.

The selsyn motor 36 operates to rotate arm 50 from switch arm 60, and to rotate arm 52 to actuate switch 62 whereupon solenoid 18, brings about movement of the piston and rod in an opposite direction.

Thus, as the piston rod moves in one direction, the gear and dial rotate in one direction. As an arm actuates a switch, the plug of the valve is shifted so that pressure moves the piston in an opposite direction, and the gear and dial rotate in an opposite direction.

The dial 44 may carry indications representing the length of stroke of the pistons and fractional portions thereof.

The arms 50 and 52, by reason of detents such as 54, are rotated with the gear 42. Said arms, as previously described, are rotatable independently and relative to said gear 42 for adjustment.

When it is desired to control the stroke to less than the full stroke, it is accomplished by setting the arms relative to the dial indications. As an example, where the full stroke of the rod is say fifty inches, it may be desired to provide a less stroke say ten inches.

In such a case, the arms are adjusted relative to the indicia of the dial so that the arms 50 and 52 actuate the switches to bring about the lesser stroke. A certain angle of rotation of the gear and dial, with which the arms rotate, represents a certain length of travel of the piston rod. The arms are adjustable relative to the dial and gear so as to operate the switches on movement of the dial and arms through the certain angle.

The arms may be adjusted during operation of the mechanism. A relatively short stroke of the piston rod may be located at a predetermined location along the full stroke of said rod by adjustment of the arms.

In lieu of the switch and arm arrangement of Figs. 2 and 3, it may be desired to control operation of the valve 10 by mechanical means operable by the arms 50 and 52.

It has been stated that the mechanism is adapted, among other uses, for use with apparatus for the discharge of coating materials. In such a case, it is often desired to reciprocate a device for discharging coating material. To that end, such device may be moved by the piston or operatively connected thereto so that the device will be reciprocated by reciprocation of the piston rod.

Various changes, modifications and additions may be made in the apparatus without departing from the spirit and scope of the invention, which for purposes of disclosure is shown in the form at present preferred.

It is desired to secure and claim the following by Letters Patent of the United States:

1. In combination with the rod of a piston reciprocable through a certain stroke in a cylinder, mechanism for varying the stroke and comprising in combination, a valve having a member movable in opposite directions for directing pressure to the cylinder to move the piston in opposite directions, a support having a dial and gear rotatable thereon in opposite directions, normally open switches on said support, a selsyn driven in opposite directions by the rod as it reciprocates in opposite directions, a receiving selsyn secured to said support, a source of power, connections between said source of power and selsyns and connections between said selsyns, gearing rotatable through a certain angle according to a certain travel of the rod, gearing connecting said receiving selsyn and said rotatable gearing, electrical means for moving the member of said valve, arms being adjustable relative to the gear and dial of said support and adjustable relative to one another and being rotatable with the gear and dial of said support for actuating said switches, and connections between said source of power and switches and electrical means, said arms being adapted to actuate said switches accordingly as the dial and gear of said support rotate in opposite directions.

2. In combination with a piston reciprocable within a cylinder, mechanism for controlling the length of stroke of said piston within said cylinder, the said mechanism comprising valve means having connections to said cylinder on opposite sides of said piston, said valve means having a connection to a source of pressure, said valve means having electromagnetic means for controlling said valve, said electromagnetic means having two windings for respectively controlling the application of pressure to the two sides of said piston in said cylinder, selsyn motor means coupled to said piston and operated thereby with piston movement, a receiving selsyn motor coupled to said first named selsyn, a source of electric power connected to said selsyns and connections between said selsyns for providing selsyn operation, a support, means for mounting said receiving selsyn on said support, a dial and gear carried by said support, said gear being rotatable, a pair of normally open switches on said support, a pair of clock-like hands rotatably carried by said support in coaxial relation to said gear, means for driving said gear from said receiving selsyn, means for normally coupling said two hands to said gear, said coupling means being manually releasable to permit independent adjustment of said hands with respect to each other and with respect to said gear, said switches being so secured as to be actuated by said arms.

3. The construction according to claim 2 wherein said connections between said arms and gear include spring detents which may be manually released.

References Cited in the file of this patent

UNITED STATES PATENTS

| | | |
|---|---|---|
| 1,938,762 | Haas | Dec. 12, 1933 |
| 2,021,066 | Huxford et al. | Nov. 12, 1935 |
| 2,376,359 | Hultin | May 22, 1945 |